US011923121B2

(12) United States Patent
Kobayashi et al.

(10) Patent No.: US 11,923,121 B2
(45) Date of Patent: Mar. 5, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Takehito Kobayashi, Yokkaichi (JP); Kohei Yoshikawa, Yokkaichi (JP); Kazuhiro Inaba, Yokkaichi (JP); Masatoshi Koike, Yokkaichi (JP); Yoshiki Numazawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 819 days.

(21) Appl. No.: 16/980,062

(22) PCT Filed: Mar. 5, 2019

(86) PCT No.: PCT/JP2019/008583
§ 371 (c)(1),
(2) Date: Sep. 11, 2020

(87) PCT Pub. No.: WO2019/176645
PCT Pub. Date: Sep. 19, 2019

(65) Prior Publication Data

US 2021/0159008 A1 May 27, 2021

(30) Foreign Application Priority Data

Mar. 14, 2018 (JP) ................................ 2018-046422

(51) Int. Cl.
*H01F 27/24* (2006.01)
*H01F 27/02* (2006.01)
(Continued)

(52) U.S. Cl.
CPC ......... *H01F 27/263* (2013.01); *H01F 27/022* (2013.01); *H01F 27/2823* (2013.01); *H01F 27/324* (2013.01); *H01F 37/00* (2013.01)

(58) Field of Classification Search
USPC .......................................................... 336/212
See application file for complete search history.

(56) References Cited

U.S. PATENT DOCUMENTS

2012/0139684 A1* 6/2012 Kobayashi ............ H01F 27/306 336/92
2013/0038415 A1* 2/2013 Ooishi .................... H01F 37/00 336/61
(Continued)

FOREIGN PATENT DOCUMENTS

JP 2013-135191 A 7/2013
JP 2013-145850 A 7/2013
(Continued)

OTHER PUBLICATIONS

International Search Report, Application No. PCT/JP2019/008583, dated May 28, 2019. ISA/Japan Patent Office.

*Primary Examiner* — Ronald Hinson
(74) *Attorney, Agent, or Firm* — Honigman LLP

(57) ABSTRACT

A reactor includes a coil having a winding portion; a magnetic core including an inner core portion and an outer core portion disposed outside the winding portion; a resin cover housing at least a portion of the magnetic core; and an
(Continued)

adhesive portion filling a gap between an outer circumferential surface of a housing portion of the magnetic core and an inner circumferential surface of the resin cover bonding the housing portion with the resin cover. The resin cover includes: a flange portion having a surface that comes into contact with an end face of the winding portion and a through hole; an outer cover portion having housing portion housing the outer core portion and an abutting portion that contacts a portion of the flange portion; and a protruding portion that forms the gap between an outer circumferential surface of the outer core portion.

6 Claims, 4 Drawing Sheets

(51) Int. Cl.

| | |
|---|---|
| ***H01F 27/26*** | (2006.01) |
| ***H01F 27/28*** | (2006.01) |
| ***H01F 27/32*** | (2006.01) |
| ***H01F 37/00*** | (2006.01) |

(56) References Cited

U.S. PATENT DOCUMENTS

| | | | | |
|---|---|---|---|---|
| 2013/0182478 | A1* | 7/2013 | Nomura | H02M 7/42 336/61 |
| 2015/0035636 | A1* | 2/2015 | Nakatsu | H01F 27/306 335/297 |
| 2015/0162119 | A1* | 6/2015 | Nakatsu | H01F 27/323 336/198 |
| 2016/0035475 | A1* | 2/2016 | Maeno | H01F 37/00 336/208 |
| 2016/0055953 | A1* | 2/2016 | Hirata | H01F 27/327 336/96 |
| 2016/0189862 | A1* | 6/2016 | Miyauchi | H01F 37/00 29/606 |
| 2016/0343490 | A1 | 11/2016 | Maeno et al. | |
| 2018/0061567 | A1* | 3/2018 | Maeno | H01F 41/0246 |
| 2019/0027295 | A1 | 1/2019 | Hirabayashi et al. | |
| 2019/0287714 | A1 | 9/2019 | Yoshikawa et al. | |

FOREIGN PATENT DOCUMENTS

| | | |
|---|---|---|
| JP | 2015-126143 A | 7/2015 |
| JP | 2015-126146 A | 7/2015 |
| JP | 2017-069325 A | 4/2017 |

* cited by examiner

REACTOR

CROSS-REFERENCE TO RELATED APPLICATIONS

This application is the U.S. national stage of PCT/JP2019/008583 filed on Mar. 5, 2019, which claims priority of Japanese Patent Application No. JP 2018-046422 filed on Mar. 14, 2018, the contents of which are incorporated herein.

TECHNICAL FIELD

The present disclosure relates to a reactor.

BACKGROUND

JP 2015-126146A discloses a reactor that is used in a vehicle-mounted converter or the like, the reactor including: a coil that includes a pair of winding portions; a magnetic core that includes a plurality of core pieces that are disposed on the inner side and the outer side of the winding portions and are assembled into an annular shape; and a resin molded portion that covers the outer circumference of the core piece or the group of core pieces.

There is a demand for a reactor that has excellent heat dissipationability and excellent manufacturability.

As disclosed in JP 2015-126146A, when the coil is exposed from the resin molded portion, the winding portions of the coil can come into direct contact with a liquid cooling medium. Accordingly, the reactor has excellent heat dissipationability. However, in this case, it is necessary to place a core piece or an assembled body of a plurality of core pieces in a molding die for the resin molded portion. From this point of view, there is a demand for an improvement in manufacturability.

Accordingly, it is an object of the present disclosure to provide a reactor that has excellent heat dissipationability and excellent manufacturability.

SUMMARY

A reactor according to the present disclosure includes: a coil that includes a winding portion; a magnetic core that includes an inner core portion that is disposed within the winding portion and an outer core portion that is disposed outside the winding portion; a resin cover that houses at least a portion of the magnetic core; and an adhesive portion that is provided so as to fill a gap between an outer circumferential surface of a housing portion of the magnetic core and an inner circumferential surface of the resin cover, and bonds the housing portion and the resin cover.

The resin cover includes: a flange portion that includes a surface that comes into contact with an end face of the winding portion and a through hole through which the inner core portion is inserted; an outer cover portion that includes a housing portion that houses the outer core portion and an abutting portion that comes into contact with a portion of the flange portion, the portion being on a side opposite to the surface that comes into contact with the winding portion; and a protruding portion that forms the gap between an outer circumferential surface of the outer core portion and an inner circumferential surface of the outer cover portion in a state in which the flange portion and the outer cover portion abut against each other.

Advantageous Effect of Disclosure

A reactor according to the present disclosure has excellent heat dissipationability and excellent manufacturability.

DETAILED DESCRIPTION OF PREFERRED EMBODIMENTS

Figure 1:
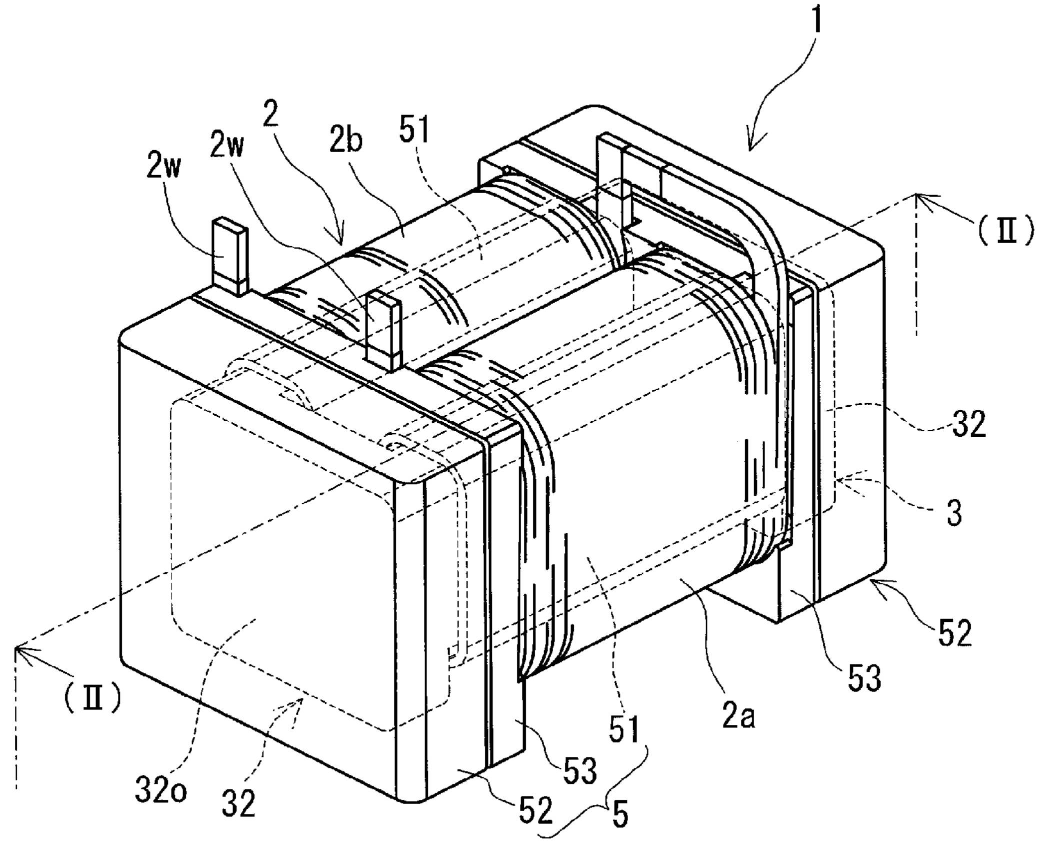
FIG. 1 is a schematic perspective view of a reactor according to Embodiment 1.

First, an embodiment of the present disclosure will be given and described.

A reactor according to an aspect of the present disclosure includes: a coil that includes a winding portion; a magnetic core that includes an inner core portion that is disposed within the winding portion and an outer core portion that is disposed outside the winding portion; a resin cover that houses at least a portion of the magnetic core; and an adhesive portion that is provided so as to fill a gap between an outer circumferential surface of a housing portion of the magnetic core and an inner circumferential surface of the resin cover, and bonds the housing portion and the resin cover.

The resin cover includes: a flange portion that includes a surface that comes into contact with an end face of the winding portion and a through hole through which the inner core portion is inserted; an outer cover portion that includes a housing portion that houses the outer core portion and an abutting portion that comes into contact with a portion of the flange portion, the portion being on a side opposite to the surface that comes into contact with the winding portion; and a protruding portion that forms the gap between an outer circumferential surface of the outer core portion and an inner circumferential surface of the outer cover portion in a state in which the flange portion and the outer cover portion abut against each other.

The reactor according to the present disclosure has excellent heat dissipationability and excellent manufacturability for the following reasons.

Heat Dissipationability

In the reactor according to the present disclosure, the outer circumferential surface of the winding portion of the coil is exposed without being substantially covered by the resin cover. For this reason, for example, the winding portion can come into direct contact with a liquid cooling medium or air from a fan, or the winding portion can be brought close to a cooling mechanism itself or an installation object that includes a cooling mechanism. Accordingly, excellent heat dissipation efficiency can be obtained.

Manufacturability

It is unnecessary to house a core piece or the like in a molding die when manufacturing the resin cover through injection molding or the like. Also, in the process of manufacturing the reactor according to the present disclosure, by simply causing the flange portion and the outer cover portion to abut against each other when bonding the resin cover and the magnetic core with an adhesive, a gap for forming an adhesive portion is automatically formed between the outer circumferential surface of the outer core portion and the housing portion of the outer cover portion, according to the protruding portion. Furthermore, an adhesive portion that has a thickness that corresponds to the size of the gap can also be automatically formed.

In addition, in the reactor according to the present disclosure, the outer core portion and the outer cover portion can be firmly bonded by the adhesive portion that has a thickness that corresponds to the size of the gap. Typically, the adhesive portion with a predetermined thickness is provided over the entire region between the outer circumferential surface of the outer core portion and the inner circumferential surface of the housing portion of the outer cover portion, and thus the outer core portion and the outer cover portion can be firmly bonded. The reactor according to the present disclosure as described above also has excellent strength as a unitary body composed of the magnetic core and the resin cover.

Furthermore, in the reactor according to the present disclosure, with the resin cover, it is possible to achieve mechanical protection of the magnetic core, in particular, the outer core portion, protection from the external environment, an improvement in insulation properties against the coil, and the like.

As an example of the reactor according to the present disclosure, the reactor may be configured such that the flange portion includes a tubular portion that is disposed so as to overlap an opening-side region of the outer cover portion, and the tubular portion of the flange portion and the opening-side region of the outer cover portion include recess portions that form a space that is filled with a portion of an adhesive that constitutes the adhesive portion.

According to the configuration described above, a portion of the adhesive is accumulated in the recess portions, and thus the leakage of an excess of the adhesive from the interface between the outer cover portion and the flange portion can be prevented, and it is therefore unnecessary to perform the step of wiping of the leaked adhesive. For this reason, the configuration described above provides further excellent manufacturability. Also, by using the recess portions as a space for accumulating an excess of adhesive left after being filled into the space between the outer core portion and the housing portion of the outer cover portion during the manufacturing process, an appropriate amount of adhesive can be easily filled into the space between the outer core portion and the outer cover portion. From this viewpoint as well, the configuration described above provides further excellent manufacturability. Furthermore, the flange portion and the outer cover portion can be integrated together with the adhesive filled into the recess portions, and the contact areas of the flange portion and the outer cover portion with respect to the adhesive can be increased by the recess portions. For this reason, the configuration described above also provides an excellent bonding strength between the flange portion and the outer cover portion. Consequently, the configuration described above provides a further excellent bonding strength between the magnetic core and the resin cover.

As an example of the reactor according to the item (2), the reactor may be configured such that the tubular portion of the flange portion and the opening-side region of the outer cover portion include claw portions that are provided to face each other and to be displaced in an axis direction of the through hole, and the two claw portions are embedded into the adhesive that is provided so as to fill the recess portions.

With the configuration described above, the flange portion and the outer cover portion both include specific claw portions as described above. For this reason, with the configuration described above, the contact areas of the flange portion and the outer cover portion with respect to the adhesive can be further increased. Also, the two claw portions are disposed such that they are positioned diagonally to each other and also disposed so as to be embedded into the adhesive, which makes it unlikely that the flange portion and outer cover portion will separate from each other. Accordingly, with the configuration described above, the bonding strength between the flange portion and the outer cover portion can be further increased, and consequently, a further excellent bonding strength between the magnetic core and the resin cover can be obtained.

As an example of the reactor according to the present disclosure, the reactor may be configured such that the resin cover includes an inner tubular portion that houses the inner core portion.

According to the configuration described above, with the inner tubular portion, it is possible to achieve mechanical protection of the inner core portion, protection from the external environment, an improvement in insulation properties against the coil, and the like. By bonding the inner tubular portion and the flange portion with an adhesive, the flange portion, the outer cover portion, and the inner tubular portion can be integrated together, and consequently, the magnetic core and the resin cover can be integrated together.

Hereinafter, an embodiment of the present disclosure will be described specifically with reference to the drawings. In the diagrams, the same reference numerals indicate the same elements.

Embodiment 1

A reactor 1 according to Embodiment 1 will be described with reference primarily to FIGS. 1 to 5.

In FIG. 1, the outlines of outer core portions 32 and inner tubular portions 51 are indicated in a simplified manner by dashed lines, and the internal shape of outer cover portions 52, the outer shape of tubular portions 533 of flange portions 53, and the like are not illustrated. See FIG. 4 for the internal shape of the outer cover portions 52, and the like.

Figure 2:
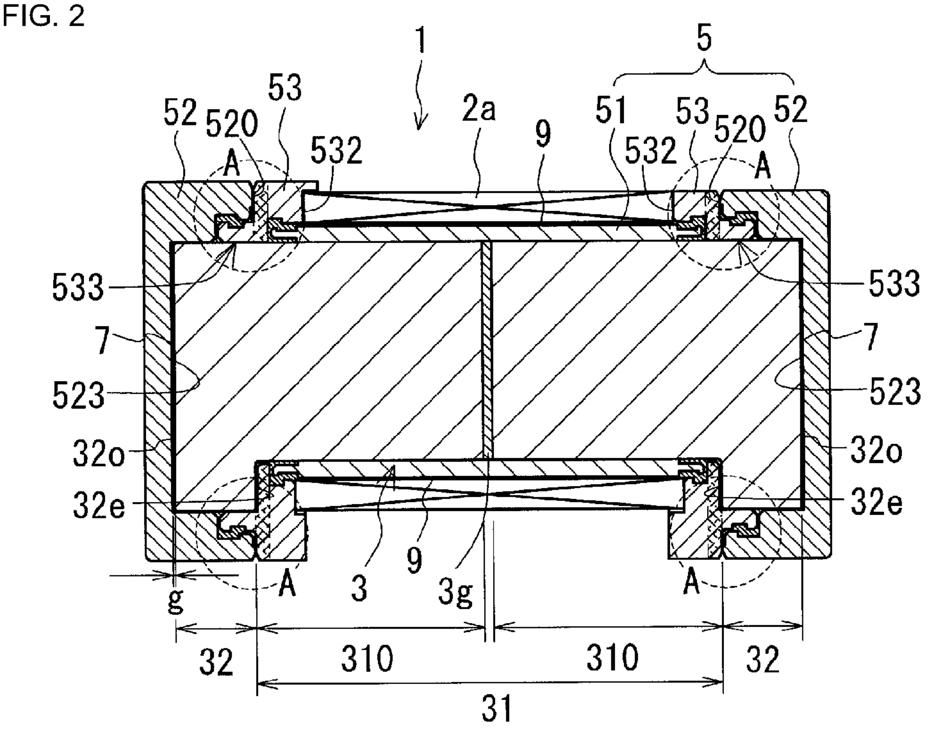
FIG. 2 is a cross sectional view of the reactor according to Embodiment 1, taken along the cutting line (II)-(II) shown in FIG. 1.

FIG. 2 is a cross sectional view of the reactor 1, taken along a plane (the cutting line (II)-(II)) that extends in the axis direction of a coil 2.

Figure 3:
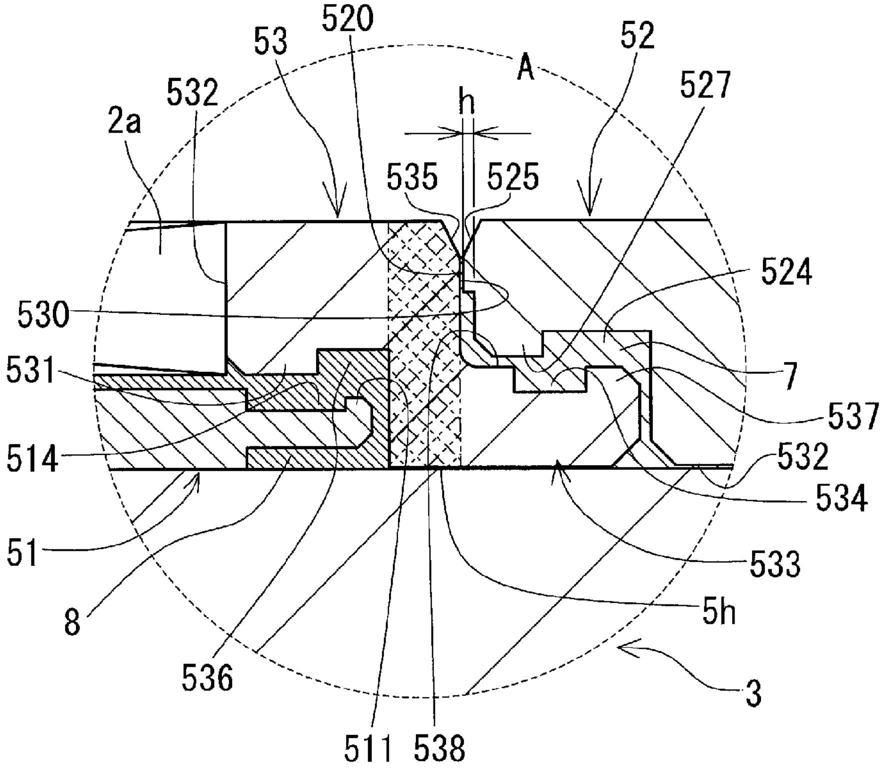
FIG. 3 is a partially enlarged cross sectional view of a dashed-line circle A shown in FIG. 2 in the reactor according to Embodiment 1.

FIG. 3 is a partially enlarged cross sectional view of one of four dashed-line circles A shown in FIG. 2. Here, only one dashed-line circle A is shown as an example because the remaining three dashed-line circles have substantially the same fitting structure although the shape, the dimensions, and the like may be different.

Figure 4:
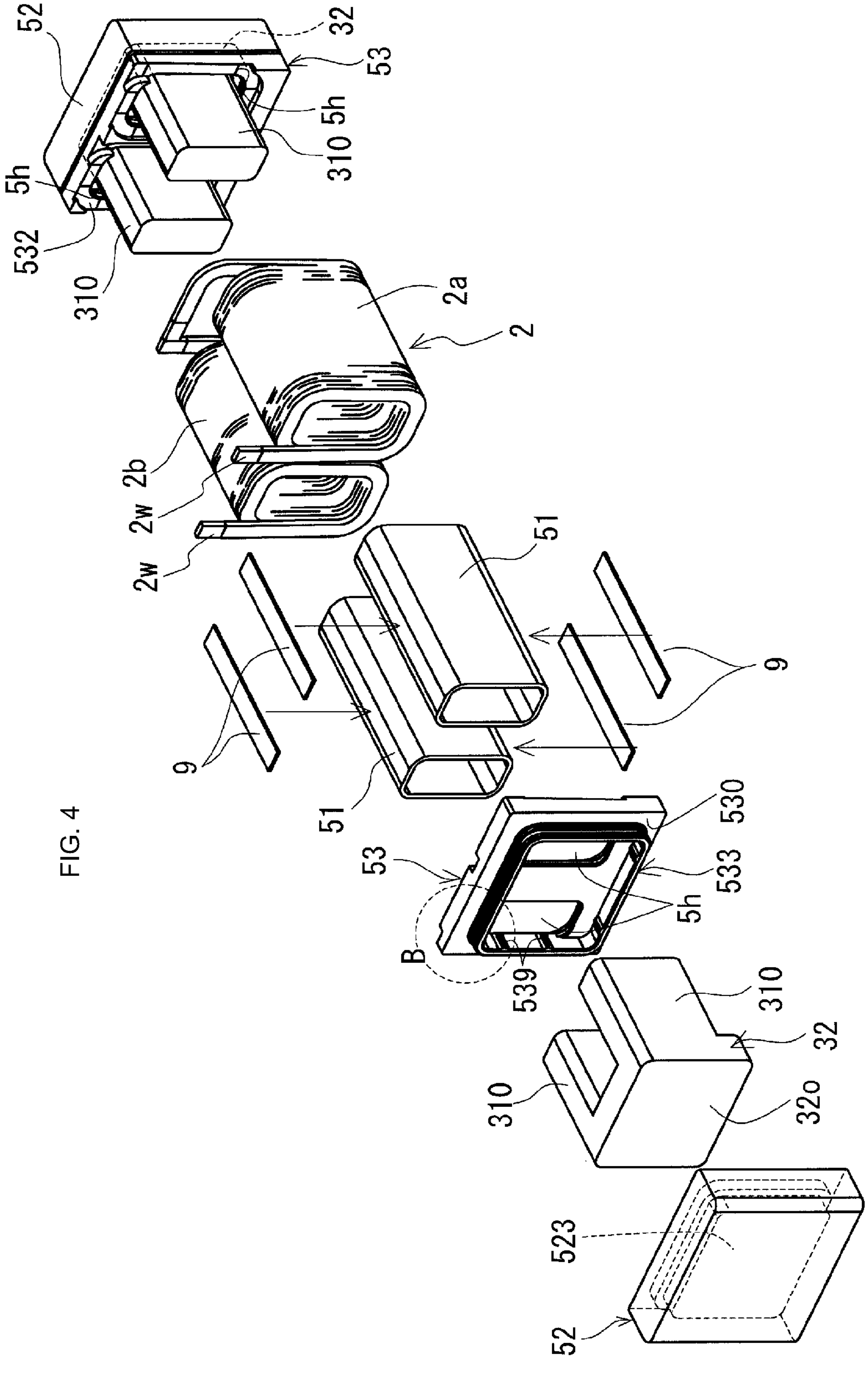
FIG. 4 is an exploded perspective view of an assembled body included in the reactor according to Embodiment 1.

In FIG. 4, one of outer cover portions 52, one of divided core pieces, and one of flange portions 53 are shown in an exploded state (see the left side of FIG. 4), and the other outer cover portion 52, the other divided core piece, and the other flange portion 53 are shown in an assembled state (see the right side of FIG. 4).

The following description will be given assuming that the lower side of FIGS. 1 and 2 is the side on which the reactor 1 is installed. The installation direction is merely an example, and thus can be changed as appropriate.

Reactor

Overview

As shown in FIG. 1, the reactor 1 according to Embodiment 1 includes a coil 2 that includes a winding portion and a magnetic core 3 disposed within and outside the winding portion. The coil 2 in this example includes a pair of winding portions 2*a* and 2*b*, and the winding portions 2*a* and 2*b* are disposed side by side such that such that their axes are parallel. The magnetic core 3 includes: inner core portions 31 (FIG. 2) that are respectively disposed in the winding portions 2*a* and 2*b*; and two outer core portions 32 that are disposed outside the winding portions 2*a* and 2*b* and form an annular closed magnetic path. The reactor 1 as described above is typically attached to an installation object (not shown) such as a converter case and used.

The reactor 1 according to Embodiment 1 further includes a resin cover 5 that houses at least a portion of the magnetic core 3 and an adhesive portion 7 (FIGS. 2 and 3) that bonds the resin cover 5 and a housing portion of the resin cover 5 in the magnetic core 3. The resin cover 5 includes a plurality of divided members. More specifically, the resin cover 5 includes: flange portions 53, each being disposed in contact with the end faces of the winding portions 2*a* and 2*b* of the coil 2; and outer cover portions 52 that respectively houses the outer core portions 32. The resin cover 5 covers the outer circumferential surface of the magnetic core 3, but does not substantially cover the outer circumferential surfaces of the winding portions 2*a* and 2*b*, and thus the outer circumferential surfaces of the winding portions 2*a* and 2*b* are exposed. As shown in FIG. 2, the adhesive portion 7 is provided so as to fill a gap g between the outer circumferential surface (here, in particular, the outer circumferential surface of the outer core portion 32) of the housing portion of the resin cover 5 in the magnetic core 3 and the inner circumferential surface of the resin cover 5.

Each flange portion 53 and each outer cover portion 52 are formed such that portions thereof (here, an outer end face 530 and an abutting portion 520, FIG. 3) abut against each other. The resin cover 5 includes a protruding portion that forms the gap g between the outer circumferential surface of the outer core portion 32 and the inner circumferential surface of the outer cover portion 52 in a state in which the flange portion 53 and the outer cover portion 52 abut against each other. The protruding portion in this example is an abutting portion 520 of the outer cover portion 52. Hereinafter, the constituent elements will be described one by one in detail.

Coil

The coil 2 in this example includes the tubular winding portions 2*a* and 2*b* that are formed of a wire being wound into a spiral shape. The coil 2 that includes a pair of the winding portions 2*a* and 2*b* that are disposed side by side may have the following configurations:

(α) a configuration in which the coil 2 includes: the winding portions 2*a* and 2*b* that are respectively formed of two independent wires 2*w* and 2*w*; and a connecting portion that connects one end portions of the wires 2*w* and 2*w* that respectively extend from the winding portions 2*a* and 2*b* (the configuration in this example, FIG. 1); and (β) a configuration in which the coil 2 includes: the winding portions 2*a* and 2*b* that are formed of one continuous wire; and a linking portion that is a portion of the wire between the winding portions 2*a* and 2*b* and links the winding portions 2*a* and 2*b*.

In either configuration, the end portions of the wire(s) that extend from the winding portions 2*a* and 2*b* (in the configuration (α), the other end portions that are not connected by the connecting portion) are used as portions to which an external apparatus such as a power source is connected. The connecting portion of the configuration (α) may be configured such that the end portions of the wires 2*w* and 2*w* are bonded directly by welding, pressure bonding, or the like, or indirectly via an appropriate metal fitting, or the like.

The wires 2*w* may be coated wires, each including a conductor wire made of copper or the like and an insulation coating that is made of a resin such as polyamide imide and covers the outer circumference of the conductor wire. The winding portions 2*a* and 2*b* in this example are edgewise coils with a rectangular tubular shape formed by edgewise winding the wires 2*w* and 2*w* that are coated flat rectangular wires, and have the same specifications such as shape, winding direction, and the number of turns. With the use of edgewise coils, the space factor can be easily increased, and a small coil 2 can be obtained. Also, in this example, because the winding portions 2*a* and 2*b* have a rectangular tubular shape, the outer circumferential surface of each of the winding portions 2*a* and 2*b* can include four rectangular flat surfaces. If one of the four flat surfaces is used as, for example, the installation surface, the distance from the installation surface of the winding portions 2*a* and 2*b* to the installation object can be made uniform. Alternatively, if one of the four flat surfaces is disposed, for example, near a cooling mechanism, the distance from the surface to the cooling mechanism can be made uniform. For this reason, the winding portions 2*a* and 2*b* can efficiently dissipate heat to the installation object or the cooling mechanism, and excellent heat dissipationability can be obtained.

The shape, the size, and the like of the wire 2*w* and the winding portions 2*a* and 2*b* can be changed as appropriate. For example, a coated round wire may be used as the wire, or the shape of the winding portions 2*a* and 2*b* may be changed to a tubular shape with no corners such as a cylindrical tubular shape or a race track-like tubular shape. Also, the winding portions 2*a* and 2*b* may have different specifications.

In the reactor 1 according to Embodiment 1, the outer circumferential surfaces of the winding portions 2*a* and 2*b* are not fully covered by the resin cover 5, and thus are exposed. In this example, a portion of the resin cover 5 (an inner tubular portion 51, which will be described later) is present within each of the winding portions 2*a* and 2*b*.

Magnetic Core

As shown in FIG. 4, the magnetic core 3 in this example includes two U-shaped divided core pieces. The divided core pieces each include one outer core portion 32 and two inner core pieces 310 that protrude from the outer core portion 32. The two divided core pieces are assembled such that the end faces of the inner core pieces 310 oppose each other, and the inner core pieces 310 of the two divided core pieces are connected so as to form one inner core portion 31 (see FIG. 2). The magnetic core 3 in this example further includes a gap material 3*g* that is interposed between the inner core pieces 310 that are disposed opposing each other (see FIG. 2).

The divided core pieces in this example have the same shape and the same size. The inner core portion 31 (the inner core pieces 310) and the outer core portions 32 have a rectangular parallelepiped outer shape. The outer shape of the inner core portion 31 is substantially similar to the inner circumferential shape of the winding portions 2*a* and 2*b* of the coil 2. Inner end faces 32*e* from which the inner core pieces 310 of the outer core portions 32 protrude are flat surfaces (FIG. 2). The installation object-side surface (here, the lower surface) of each outer core portion 32 protrudes to a position lower than the lower surfaces of the inner core pieces 310. As a result of the installation object-side surfaces of the core portions 32 protruding in the manner described above, the magnetic path of the outer core portions 32 can be increased, and the size in the axis direction of the winding portions 2*a* and 2*b* in the reactor 1 can be easily reduced (easily shortened), and thus a small reactor 1 can be obtained. The shape, the size, and the like of the divided core pieces, the inner core portion 31, and the outer core portions 32 can be changed as appropriate (see Variations 3 and 4, which will be described below).

Constituent Material

The divided core pieces described above may be molded bodies composed mainly of a soft magnetic material, or the like. As the soft magnetic material, a metal such as iron or an iron alloy (for example, a Fe—Si alloy, a Fe—Ni alloy, or the like), a non-metal such as ferrite, or the like can be used. Examples of the molded bodies include: powder compact molded bodies formed by compact molding a soft magnetic material powder, a coated soft magnetic powder with an insulation coating, or the like; molded bodies of a composite material formed by solidifying a flowable mixture of a soft magnetic powder and a resin; sintered bodies such as ferrite cores; and the like. Depending on the shape of the core pieces, it is also possible to use stacked bodies in each of which plate members are stacked, such as electromagnetic steel plates, or the like.

In the case where the magnetic core 3 includes a gap material 3*g*, the gap material 3*g* may be a solid body such as a plate member, or may be an air gap. Examples of the constituent material of the solid body include a non-magnetic material such as alumina, a magnetic material that has a relative magnetic permeability lower than that of the divided core pieces described above, and the like. The gap material 3*g* may be omitted.

Resin Cover

Overview

As shown in FIG. 2, the reactor 1 in this example includes a resin cover 5 that houses the magnetic core 3 while exposing the winding portions 2*a* and 2*b* of the coil 2. The resin cover 5 is a resin molded body manufactured independently of the magnetic core 3, and has an inner circumferential shape that substantially corresponds to the outer circumferential shape of the magnetic core 3 that is housed. The resin cover 5 contributes to mechanical protection of the magnetic core 3, protection from the external environment (an improvement in corrosion resistance), and the like. Also, the resin that constitutes the resin cover 5 is typically an insulating material. Accordingly, as a result of the resin cover 5 being interposed between the coil 2 and the magnetic core 3, the resin cover 5 also contributes to enhancing insulation properties between the coil 2 and the magnetic core 3. Furthermore, the resin cover 5 also contributes to positioning of the magnetic core 3 with respect to the winding portions 2*a* and 2*b* of the coil 2 by being molded into a predetermined shape.

The resin cover 5 in this example houses substantially the entirety of the magnetic core 3. More specifically, the resin cover 5 includes: two flange portions 53 that are interposed between the end faces of the winding portions 2*a* and 2*b* of the coil 2 and the inner end faces 32*e* of the outer core portions 32; two outer cover portions 52 that respectively house the outer core portions 32; and inner tubular portions 51 that respectively house the inner core portions 31 (see also FIG. 4). As shown in FIG. 2, the inner tubular portions 51 are disposed on the winding portions 2*a* and 2*b*-side (hereinafter, referred to as "coil side"), and the outer cover portion 52 is disposed on the side (hereinafter, referred to as "outer core side") away from the winding portions 2*a* and 2*b* across one flange portion 53. The resin cover 5 in this example is provided such that a portion of the flange portion 53 on the coil side and the end portions of the inner tubular portions 51 overlap each other, and a portion of the flange portion 53 on the outer core side and an opening portion of the outer cover portion 52 overlap each other. The flange portions 53 have substantially the same shape. Also, the outer cover portions 52 and the inner tubular portions 51 also have substantially the same shape. For this reason, in the following description, only one side will be described.

Flange Portion

As shown in FIG. 4, the flange portion 53 is a frame-like member with a hole passing therethrough. More specifically, the flange portion 53 includes a surface (an inner end face 532) that comes into contact with the end faces of the winding portions 2*a* and 2*b* of the coil 2 and through holes 5*h* through which two inner core portions 31 (here, the inner core pieces 310) are inserted. The two through holes 5*h* are provided side by side in a direction perpendicular to the axis direction of the winding portions 2*a* and 2*b*. Also, the flange portion 53 in this example includes a short tubular portion that protrudes from a plate-like base portion (see a virtual region cross-hatched with dash-dotted lines in FIGS. 2 and 3) toward both the coil side and the outer core side of the base portion, respectively. On the coil side of the base portion, an outer circumferential-side region forms a tubular portion that protrudes toward the winding portions 2*a* and 2*b*. A surface of the tubular portion that opposes the end faces of the winding portions 2*a* and 2*b* is an inner end face 532. On the outer core side of the base portion, an inner circumferential-side region near the through holes 5*h* forms a tubular portion 533 that protrudes toward the outer core portion 32.

The coil side of the flange portion 53 will be described.

The inner end face 532 in this example has a shape that corresponds to the end faces of the winding portions 2*a* and 2*b*, and is a surface inclined in a spiral manner (see the flange portion 53 on the right side of FIG. 4). For this reason, the inner end face 532 can come into contact with the entirety of the end faces of the winding portions 2*a* and 2*b*. Also, positioning between the winding portions 2*a* and 2*b* and the flange portions 53 can be easily performed, and the winding portions 2*a* and 2*b* and the flange portions 53 are not easily displaced. Also, the inner core pieces 310 of the divided core pieces are inserted through the through holes 5*h* of the flange portions 53, and thus positioning between the magnetic core 3 and the flange portions 53 can be easily performed, and the magnetic core 3 and the flange portions 53 are not easily displaced. As a result, the magnetic core 3 can be appropriately positioned with respect to the winding portions 2*a* and 2*b* via the flange portions 53. With the reactor 1 as described above, desired magnetic characteristics can be appropriately obtained, and excellent ease of assembly can also be obtained. The shape of the inner end face 532 can be changed as appropriate. For example, the inner end face 532 may be a flat surface that is perpendicular to the axis direction of the through holes 5*h*. Here, the axis direction of the through holes 5*h* is substantially equal to the axis direction of the winding portions 2*a* and 2*b* and the axis direction of the inner core portion 31.

The flange portion 53 in this example has, on the coil side, a bottomed tubular shape whose bottom is one surface of the base portion as shown in FIG. 3. In the tubular shape, end portions of the inner tubular portions 51, which will be described later, are disposed so as to overlap the inner circumferential surface of the tubular shape. In the inner circumferential surface of the tubular shape, an opening-side region close to the inner end face 532 (the left side region in FIG. 3) locally protrudes toward the inside of the tubular shape (the lower side of FIG. 3) and forms a claw portion 531. In other words, a bottom-side region is relatively recessed with respect to the claw portion 531. The recess portion 536 is filled with an adhesive that constitutes an adhesive portion 8, which will be described later. The claw portion 531 is provided so as to face a claw portion 511 (described later) provided at an end portion of the inner tubular portion 51 and to be displaced in the axis direction of the through holes 5*h*. Furthermore, the claw portion 531 is provided so as to protrude toward a recess portion 514 (described later) provided at the end portion of the inner tubular portion 51. The claw portions 531 and 511 are disposed so as to be embedded into the adhesive portion 8. This example shows a case where the protrusion heights of the claw portions 531 and 511 are adjusted such that a slight gap is formed between the leading end portions of the claw portions 531 and 511 when viewed in the radial direction of the through holes 5*h*. The protrusion heights can be adjusted such that the leading end portions overlap in the radial direction.

The outer core side of the flange portion 53 will be described.

The flange portion 53 in this example includes, on the outer core side, a flat outer end face 530 and a relatively short tubular portion 533 that protrudes toward the outer core portion 32 (the outer cover portion 52). The outer end face 530 is a portion of the other surface of the base portion, provided in an annular shape along the outer circumferential edge of the flange portion 53 (FIG. 4), and used as an abutting portion of the flange portion 53 that abuts against the outer cover portion 52. In the other surface of the base portion, a region surrounded by the tubular portion 533 abuts against the inner end face 32*e* of the outer core portion 32 (FIG. 2).

As shown in FIG. 4, the tubular portion 533 in this example is provided so as to surround the through holes 5*h* that are provided side by side, and a portion of the inner circumferential surface of the tubular portion 533 forms a portion of the inner circumferential surfaces of the through holes 5*h*. The outer shape of the tubular portion 533 is a rectangular tubular shape that corresponds to the outer shape of the outer core portion 32, and a connection portion with the inner core portion 31 of the outer core portion 32 and the vicinity thereof are housed (FIG. 2). The tubular portion 533 is disposed so as to overlap the opening-side region of the outer cover portion 52 (FIG. 2).

Figure 5:
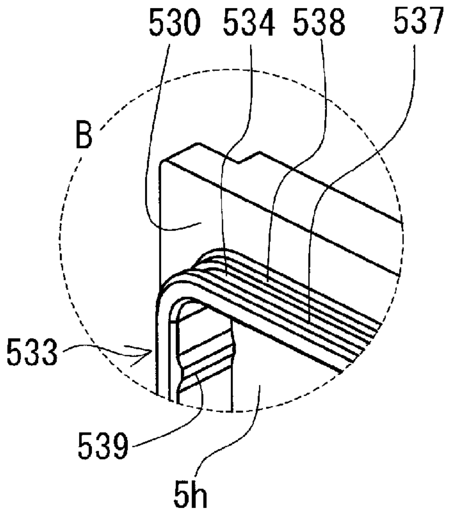
FIG. 5 is a partially enlarged view of a dashed-line circle B shown in FIG. 4 in the reactor according to Embodiment 1.

As shown in the enlarged views of FIGS. 3 and 5, the outer shape of the tubular portion 533 in this example has a protrusion/recess shape. Specifically, the tubular portion 533 includes a recess portion 534 provided at an intermediate portion between an opening-side region (the right side region in FIG. 3) and a connection-side region that connects to the outer end face 530. In other words, the opening-side region protrudes from the bottom of the recess portion 534, and forms a claw portion 537. The connection-side region includes an opposing surface 538 disposed opposing a portion of a claw portion 527 (described later) of the outer cover portion 52. An adhesive that constitutes the adhesive portion 7 is provided so as to fill the space between the tubular portion 533 and the opening-side region of the outer cover portion 52. The recess portion 534 forms a space that is filled with a portion of the adhesive that constitutes the adhesive portion 7, and contributes to increasing the space that is formed between the tubular portion 533 and the opening-side region of the outer cover portion 52 and filled with the adhesive. The claw portion 537 is provided so as to protrude toward a recess portion 524 (described later) of the outer cover portion 52, and is disposed so as to be embedded into the adhesive portion 7. This example shows a case where the protrusion heights of the claw portions 537 and 527 are adjusted such that a slight gap is formed between the leading end portions of the claw portions 537 and 527 when viewed in the radial direction of the through holes 5*h*. The protrusion heights can be adjusted such that the leading end portions overlap in the radial direction.

Furthermore, as shown in FIG. 4, the tubular portion 533 and a portion of the base portion in this example include a plurality of projections 539 that protrude from the inner circumferential surface toward the inside of the tubular portion 533. The projections 539 are spaced apart in the circumferential direction of the inner circumferential surface. In a state in which the magnetic core 3 and the flange portion 53 are assembled, due to the projections 539, a slight gap is formed between the outer circumferential surface of the outer core portion 32 and the inner circumferential surface of the tubular portion 533. As a result of the gap being filled with a portion of the adhesive that constitutes at least one of the adhesive portions 7 and 8, the magnetic core 3 and the flange portion 53 can be bonded. The gap is not necessarily filled with the adhesive, and the projections 539 may be omitted. This is because the magnetic core 3 and the resin cover 5 can be firmly bonded since the reactor 1 in this example includes an adhesive portion 7 that mainly bonds the outer core portion 32 and the outer cover portion 52 and an adhesive portion 8 that mainly bonds the inner core portion 31, the flange portion 53, and the inner tubular portion 51.

In addition, on the outer core side of the flange portion 53, a cutout portion 535 is formed as a result of a corner between the outer circumferential surface of the base portion and the outer end face 530 being chamfered. The cutout portion 535 will be described in detail when describing a cutout portion 525 of the outer cover portion 52.

In addition, the flange portion 53 in this example has an outer shape and a size that correspond to those of the outer cover portion 52, and the outer circumferential surface of the flange portion 53 and the outer circumferential surface of the outer cover portion 52 are substantially flush with each other (FIGS. 1 and 2). However, changes can be made as appropriate.

Outer Cover Portion

The outer cover portion 52 is a box-shaped member with an opening portion (FIG. 2). More specifically, the outer cover portion 52 includes: a housing portion 523 that houses the outer core portion 32; and an abutting portion 520 that is a portion that is located on the side opposite to the inner end face 532 of the flange portion 53 that is in contact with the winding portions 2*a* and 2*b* and, here, the abutting portion 520 being configured to come into contact with the outer end face 530 (see also FIG. 3). The abutting portion 520 in this example is formed as a result of an opening-side end face of the outer cover portion 52 locally protruding toward the flange portion 53 (the coil 2) in the depth direction of the housing portion 523 (see also FIG. 3). The protrusion height h of the abutting portion 520 (FIG. 3) is sized to form a gap g with a predetermined size between the outer circumferential surface of the outer core portion 32, here, in particular, an outer end face 32*o* and the inner circumferential surface of the outer cover portion 52, here, in particular, the inner bottom of the housing portion 523 in a state in which the abutting portion 520 abuts against the outer end face 530 of the flange portion 53. The abutting portion 520 described above functions as a protruding portion that forms the gap g in the state in which the abutting portion 520 abuts against the outer end face 530 of the flange portion 53. As used herein, the protrusion height h is a dimension that extends along the depth direction of the housing portion 523. The depth direction refers to the axis direction of the inner core portion 31, and consequently, the axis direction of the winding portions 2*a* and 2*b*.

As shown in FIG. 2, the inner circumferential shape of the outer cover portion 52 in this example is a stepped shape that has different opening areas in the depth direction thereof, and the opening-side region has an opening area larger than an inner bottom-side region, here, the housing portion 523 (see also the dashed lines in the outer cover portion 52 on the left side of FIG. 4). The opening-side region of the outer cover portion 52 is a portion that houses the tubular portion 533 of the flange portion 53 through which the outer core portion 32 is inserted, and the housing portion 523 is a portion that houses substantially only the outer core portion 32.

The inner bottom side of the outer cover portion 52 will be described.

In this example, the housing portion 523 that is an inner bottom-side region of the outer cover portion 52 has a rectangular parallelepiped inner circumferential shape that corresponds to the outer shape of the outer core portion 32 that is housed. However, the housing portion 523 is slightly larger in size than the outer shape of the outer core portion 32 such that the gap g that can form the adhesive portion 7 is formed between the housing portion 523 and the outer core portion 32.

The opening side of the outer cover portion 52 will be described.

In this example, the opening-side region of the outer cover portion 52 is a tubular portion that has inner dimensions that correspond to the outer dimensions of the tubular portion 533. In a surface of the tubular portion that opposes the outer end face 530 of the flange portion 53, a locally protruding portion is the abutting portion 520. A gap that corresponds to the protrusion height h is formed between a portion other than the abutting portion 520 and the outer end face 530. The protrusion height h of the abutting portion 520 can be selected such that the gap g has a desired size as described above. The size of the gap g varies depending on the size of the outer end face 32*o* of the outer core portion 32 or the like, but may be, for example, about 0.1 mm or more and 1.0 mm or less. The protrusion height h varies depending on the size of the outer core portion 32, the size of the gap g, and the like, but may be, for example, about 0.05 mm or more and 1.0 mm or less. The protrusion height h may be about the same as the gap g, smaller than the gap g, or larger than the gap g depending on the size of the outer core portion 32 and the size of the housing portion 523 of the outer cover portion 52.

Also, as shown in FIG. 3, in the opening-side region of the outer cover portion 52, the inner circumferential shape has a protrusion/recess shape, and includes a claw portion 527 and a recess portion 524. Specifically, in the opening-side region, an opening edge and a region in the vicinity thereof protrudes toward the inside (toward the lower side of FIG. 3), and the inner bottom-side region is relatively recessed. The opening edge and the region in the vicinity thereof form claw portion 527, and the inner bottom-side region forms the recess portion 524.

In this example, the opening-side region of the outer cover portion 52 and the tubular portion 533 of the flange portion 53 are disposed in an overlapping manner, and a gap formed therebetween is filled with a portion of the adhesive that constitutes the adhesive portion 7. The recess portion 524 forms a space that is filled with a portion of the adhesive that constitutes the adhesive portion 7, and contributes to increasing the space that is filled with the adhesive, the space being formed between the opening-side region of the outer cover portion 52 and the tubular portion 533. The claw portion 527 is provided so as to protrude toward the recess portion 534 of the flange portion 53, and is disposed so as to be embedded into the adhesive portion 7. In particular, in this example, the claw portion 527 and the claw portion 537 of the tubular portion 533 of the flange portion 53 are provided such that they face each other and are displaced in the axis direction of the through holes 5*h*. In short, the two claw portions 527 and 537 are positioned diagonally to each other and are embedded into the adhesive portion 7. Furthermore, a portion of the adhesive that fills the two recess portions 524 and 534 is interposed between the two claw portions 527 and 537 provided side by side in the axis direction of the through holes 5*h*. The outer cover portion 52 and the flange portion 53 described above are firmly integrated together by the adhesive portion 7. Also, with the adhesive portion 7, in addition to the outer cover portion 52, the flange portion 53 is also fixed to the magnetic core 3, and thus both of the outer cover portion 52 and the flange portion 53 are unlikely detach from the magnetic core 3.

In addition, in the opening-side region of the outer cover portion 52, a cutout portion 525 is formed as a result of a corner between the extended surface of the abutting portion 520 and the outer circumferential surface of the outer cover portion 52 being chamfered. Here, an example will be described in which the cutout portion 525 and the cutout portion 535 of the flange portion 53 have chamfers, but they may have fillets. By forming the cutout portions 525 and 535, even if the adhesive in a flowable state flows toward the interface between the outer cover portion 52 and the flange portion 53 before the adhesive portion 7 is solidified during the manufacturing process, the adhesive is accumulated in a space with a triangular cross section formed by cutout portions 525 and 535. For this reason, leakage of the adhesive (an excess of adhesive) from the interface can be prevented. At least one of the cutout portions 525 and 535 may be omitted. This is because, in this example, both of the outer cover portion 52 and the flange portion 53 respectively include the recess portions 524 and 534, and thus the adhesive can be easily accumulated, and leakage of the adhesive can be easily prevented even if the cutout portions 525 and 535 are omitted.

In addition, as described above, the outer cover portion 52 in this example is configured to have an outer shape and a size that correspond to those of the flange portion 53, but changes may be made as appropriate. Also, this example shows a case where the outer shape of the outer cover portion 52 is rectangular parallelepiped, but changes may be made as appropriate. For example, the outer cover portion 52 may include, at appropriate positions, a fixing piece for fixing the reactor 1 to the installation object, a terminal strip to which end portions of the wires 2*w* are connected, supports for supporting various types of sensors (none of them are shown), and the like.

Inner Tubular Portion

The inner tubular portions 51 in this example are tubular members, each having a length that allows the inner core portion 31 (the inner core piece 310) to be housed over the entire length thereof and also having an inner circumferential shape that corresponds to the outer shape of the inner core portion 31 (FIG. 4). Also, each inner tubular portion 51 in this example has a uniform thickness over the entire length and the entire circumference thereof, except for two end portions. The two end portions of the inner tubular portion 51 have a thickness smaller than the thickness of a portion other than the two end portions. As a result of the two end portions being locally thin, the inner tubular portion 51 can be easily inserted into the coil-side tubular portion of the flange portion 53 during the manufacturing process, and excellent ease of assembly can be obtained. Furthermore, the contact area of the two end portions with the adhesive portion 8 can be increased as compared with the case where the two end portions are not thin, and the bonding strength between the inner tubular portion 51 and the flange portion 53 can be easily increased. In FIG. 4, the inner tubular portions 51 are shown in a simplified manner as having a tubular shape, and details of the two end portions are shown in FIG. 3.

Furthermore, in this example, as shown in FIG. 3, in each end portion of the inner tubular portion 51, a claw portion 511 is provided on the leading end side, and a recess portion 514 is provided on the root side. The claw portion 511 is provided so as to protrude toward the coil-side recess portion 536 of the flange portion 53. Also, the claw portion 511 and the coil-side claw portion 531 of the flange portion 53 are positioned diagonally to each other and are embedded into the adhesive portion 8. Furthermore, a portion of the adhesive that constitutes the adhesive portion 8 is interposed between the two claw portions 511 and 531 that are provided side by side in the axis direction of the through holes 5*h*. The inner tubular portion 51 and the flange portion 53 described above are firmly integrated together by the adhesive portion 8. Also, with the adhesive portion 8, both of the inner tubular portion 51 and the flange portion 53 are fixed to the magnetic core 3, and thus are unlikely detach from the magnetic core 3.

The shape, the size, and the like of the inner tubular portion 51 can be changed as appropriate. For example, the thickness of the inner tubular portion 51 may be made uniform over the entire length thereof. Also, at least one of the recess portions 524 and 534 and the claw portions 511, 527, 531, and 537 described above may be omitted. For other changes, see Variation 2 given below.

Constituent Material

As the constituent material of the resin cover 5, an insulating material such as any type of resin can be used. Specific examples of resins include: thermoplastic resins such as a polyphenylene sulfide (PPS) resin, a polytetrafluoroethylene (PTFE) resin, a liquid crystal polymer (LCP), polyamide (PA) resins including nylon 6 and nylon 66, a polybutylene terephthalate (PBT) resin, and an acrylonitrile-butadiene-styrene (ABS) resin. Other examples include thermosetting resins such as an unsaturated polyester resin, an epoxy resin, a urethane resin, and a silicone resin. The resin cover 5 can be manufactured using a known molding method such as injection molding.

Adhesive Portion

In the resin cover 5, at least the outer cover portion 52 is fixed to the outer core portion 32 by the adhesive portion 7 and integrated with the magnetic core 3. In this example, the overlapping portion between the outer cover portion 52 and the flange portion 53 is also filled with a portion of the adhesive that constitutes the adhesive portion 7, and the outer cover portion 52 and the flange portion 53 are integrated together by the adhesive. Also, in this example, the overlapping portion between the inner tubular portion 51 and the flange portion 53 is also filled with a portion of the adhesive that constitutes the adhesive portion 8, and the inner tubular portion 51 and the flange portion 53 are integrated together by the adhesive, and also integrated with the magnetic core 3. As a result, in the reactor 1 in this example, by using the adhesive portions 7 and 8, the resin cover 5 is integrated, and the magnetic core 3 and the resin cover 5 are integrated together. In addition, it is also possible to provide an adhesive portion (not shown) that bonds the inner core portion 31 and the inner tubular portion 51. The adhesive portion may be provided, for example, near the gap material 3*g*, or the like.

The adhesive portion 7 in this example includes: a portion provided in a space (including the gap g) between the outer circumferential surface of the outer core portion 32 and the inner circumferential surface of the housing portion 523 of the outer cover portion 52; and a portion provided in a space (including the recess portions 534 and 524) in an overlapping region between the flange portion 53 and the outer cover portion 52. A portion of the adhesive portion 7 may be provided between the inner circumferential surface of the through hole 5*h* of the flange portion 53 and the outer circumferential surface of the magnetic core 3. The adhesive portion 7 can be formed by, for example, applying an unsolidified adhesive to at least one of the inner circumferential surface of the housing portion 523 and the outer circumferential surface of the outer core portion 32, assembling the coil 2, the magnetic core 3, and the resin cover 5 while having the coating layer(s), and solidifying the adhesive during the manufacturing process.

In this example, the application amount may be adjusted such that a portion of the unsolidified adhesive that has filled the space between the housing portion 523 of the outer cover portion 52 and the outer core portion 32 leaks out into the space between the outer cover portion 52 and the flange portion 53. With this configuration, the adhesive that has leaked out fills the space between the outer cover portion 52 and the flange portion 53, in particular, the recess portions 524 and 534, and can be used to bond the outer cover portion 52 and the flange portion 53.

The adhesive portion 8 in this example includes a portion provided in a space (including the recess portions 536 and 514) formed by the inner circumferential surface of the coil-side tubular portion of the flange portion 53, the outer circumferential surface of the end portion of the inner tubular portion 51, and a portion of the outer circumferential surface of the magnetic core 3. A portion of the adhesive that constitutes the adhesive portion 8 may be included in at least one of the space between the inner circumferential surface of the winding portions 2*a* and 2*b* and the outer circumferential surface of the inner core portions 31 and the space between the inner circumferential surface of the through holes 5*h* of the flange portion 53 and the outer circumferential surface of the magnetic core 3. The adhesive portion 8 can be formed by, for example, applying an unsolidified adhesive to at least one of the inner circumferential surface of the tubular portion of the flange portion 53 and the outer circumferential surface of the end portion of the inner tubular portion 51, assembling the coil 2, the magnetic core 3, and the resin cover 5 while having the coating layer(s), and solidifying the adhesive during the manufacturing process.

The adhesive portions 7 and 8 may be formed as independent adhesive portions that are not continuous, or may be formed as one continuous adhesive portion by adjusting the adhesive application amount, the adhesive application region, and the like. Also, the adhesive portion 8 may be omitted. As a result of each outer cover portion 52 being fixed to the magnetic core 3 with the adhesive portion 7, the position of the flange portion 53 abutted by the outer cover portion 52 relative to the magnetic core 3 is restricted. Consequently, the position of the winding portions 2*a* and 2*b* abutted by the flange portion 53 relative to the magnetic core 3 is restricted. Accordingly, even if the adhesive portion 8 is omitted, mutual positioning between the coil 2, the magnetic core 3, the flange portion 53, and the outer cover portion 52 can be performed appropriately.

As the adhesive that constitutes the adhesive portions 7 and 8, an appropriate adhesive that has the property of withstanding the environment in which the reactor 1 is used and can bond the magnetic core 3 that contains a soft magnetic material such as iron and the resin cover 5 that is made of PPS resin or the like can be used. An adhesive that contains a filler such as ceramic and has excellent heat resistance, an excellent strength, and the like can be used. A commercially available adhesive, for example, an epoxy-based adhesive or the like can be used.

Other Components

The reactor 1 in this example includes a bonding layer 9 that is interposed between the winding portions 2*a* and 2*b* of the coil 2 and the inner tubular portions 51 and fixes them (FIG. 2). As the bonding layer 9, a commercially available adhesive sheet or the like can be used. By providing the bonding layer 9, the winding portions 2*a* and 2*b* can be fixed to the inner tubular portions 51, and consequently, displacement of the winding portions 2*a* and 2*b* relative to the inner core portions 31 can be prevented, and movement of the winding portions 2*a* and 2*b* (deformation of turns, or the like) can be restricted. The bonding layer 9 may be omitted.

Method for Manufacturing Reactor

The reactor 1 according to Embodiment 1 may be manufactured by, for example, as described above, applying an unsolidified adhesive to the magnetic core 3 and the resin cover 5, assembling the coil 2, the magnetic core 3, and the resin cover 5 while having the coating layers, and solidifying the coating layers to form adhesive portions 7 and 8. In the case where the reactor 1 includes a bonding layer 9, an adhesive sheet or the like may be housed in the winding portions 2*a* and 2*b* independently of the inner tubular portions 51, or may be attached in advance to the inner tubular portions 51 and housed in the winding portions 2*a* and 2*b* simultaneously with the inner tubular portions 51.

Here, if a large amount of unsolidified adhesive is applied, the adhesive can be reliably provided between the outer end face 32*o* of the outer core portion 32 and the inner bottom of the housing portion 523 of the outer cover portion 52. As a result, the adhesive portion 7 with a thickness that corresponds to the gap g can be reliably formed. Also, as a result of the adhesive portion 7 being present over the entire surface of the outer end face 32*o*, the outer core portion 32 and the outer cover portion 52 can be firmly bonded. However, there is a possibility that the excess of adhesive leaks out from, for example, the interface between the flange portion 53 and the outer cover portion 52. In this example, as described above, the recess portions 524 and 534 are formed in the overlapping portion between the flange portion 53 and the outer cover portion 52, and thus a large amount of adhesive can be accumulated. For this reason, the leakage of the excess of adhesive can be easily prevented. Furthermore, in this example, the gap near the interface is locally small. For this reason as well, the leakage of the excess of adhesive can be easily prevented. More specifically, the gap of a portion where the opposing surface 538 of the flange portion 53 and the claw portion 527 of the outer cover portion 52 oppose each other and the gap between the outer end face 530 of the flange portion 53 and the vicinity of the abutting portion 520 of the outer cover portion 52 (here, the gap with a size corresponding to the protrusion height h) are smaller than a portion where the recess portions 524 and 534 oppose each other. In addition, in this example, as described above, the excess of adhesive can also be accumulated in the cutout portions 525 and 535 formed near the interface, and thus the leakage of the excess of adhesive can be more reliably prevented.

In addition, it is preferable to apply the unsolidified adhesive such that no air bubbles remain in the coating layer. If air bubbles remain in the coating layer, air bubbles also remain in the solidified adhesive portions 7 and 8, which may lead to a reduction in the bonding strength, or the like.

Applications

The reactor 1 according to Embodiment 1 can be used as, for example, a component of a circuit that performs a voltage step-up operation and a voltage step-down operation, such as, for example, a component that constitutes any type of converter or power conversion apparatus. Examples of the converter include a vehicle-mounted converter (typically, a DC-DC converter) mounted on a vehicle such as a hybrid automobile, a plug-in hybrid automobile, an electric automobile, or a fuel cell automobile, a converter of an air conditioner, and the like.

Advantageous Effects

In the reactor 1 according to Embodiment 1, the magnetic core 3 is covered by the resin cover 5, but the outer circumferential surfaces of the winding portions 2*a* and 2*b* of the coil 2 are exposed without being substantially covered by the resin cover 5. Thus, in the reactor 1, the winding portions 2*a* and 2*b* can come into direct contact with a liquid cooling medium or a fluid cooling medium such as air from a fan, or can be brought close to an installation object or a cooling mechanism. Accordingly, heat can be efficiently dissipated, and excellent heat dissipationability can be obtained. Also, in the reactor 1, with the resin cover 5, it is possible to achieve mechanical protection of the magnetic core 3, protection from the external environment, an improvement in insulation properties against the coil 2, and the like.

In addition, the reactor 1 according to Embodiment 1 has excellent manufacturability in that the resin cover 5 can be manufactured independently of the coil 2 and the magnetic core 3. Also, in the reactor 1, by causing an outer core-side portion (here, the outer end face 530) of the flange portion 53 and the abutting portion 520 of the outer cover portion 52 to abut against each other, due to the abutting portion 520 that has a protruding shape, a predetermined gap g is automatically formed between the outer core portion 32 and the housing portion 523 of the outer cover portion 52. As a result, the adhesive portion 7 with a predetermined thickness can be formed appropriately. From this point of view as well, the reactor 1 has excellent manufacturability.

The reactor 1 in this example has the following advantageous effects.

In each of the winding portions 2*a* and 2*b* in this example, the installation object-side surface and the surface away from the other winding portion are flat surfaces, and thus further excellent heat dissipation efficiency can be obtained.

Because the gap g is provided appropriately, the adhesive portion 7 with a uniform thickness can be formed between the outer end face 32*o* of the outer core portion 32 and the inner bottom of the housing portion 523 of the outer cover portion 52. As a result, the outer core portion 32 and the outer cover portion 52 can be firmly bonded. Also, the outer end face 530 of the flange portion 53 and the protruding portion (the abutting portion 520) of the outer cover portion 52 that contribute to formation of the gap g are spaced apart from the housing portion 523 of the outer cover portion 52. Here, the housing portion 523 is a typical portion where an unsolidified adhesive is applied during the manufacturing process. Because the housing portion 523 is spaced apart from the protruding portion, a large adhesive application region can be easily ensured in the housing portion 523. Accordingly, the adhesive does not run short, and the adhesive portion 7 can be appropriately provided, as a result of which, the outer core portion 32 and the outer cover portion 52 can be firmly bonded.

The outer core-side tubular portion 533 of the flange portion 53 and the opening-side region of the outer cover portion 52 are disposed in an overlapping manner, and a portion of the adhesive that constitutes the adhesive portion 7 is provided so as to fill the overlapping portion. For this reason, the flange portion 53 and the outer cover portion 52 can be firmly bonded.

The recess portions 534 and 524 are provided in the overlapping portion, and thus large contact areas of the flange portion 53 and the outer cover portion 52 with respect to the adhesive portion 7 can be ensured. For this reason, the flange portion 53 and the outer cover portion 52 can be more firmly bonded.

In the overlapping portion, the flange portion 53 and the outer cover portion 52 include claw portions 537 and 527 that are positioned diagonally to each other, and the claw portions 537 and 527 are both embedded into the adhesive portion 7. For this reason, the flange portion 53 and the outer cover portion 52 can be more firmly bonded by a so-called anchoring effect.

The coil-side tubular portion of the flange portion 53 and the end portions of the inner tubular portions 51 are disposed in an overlapping manner, and a portion of the adhesive that constitutes the adhesive portion 8 is provided so as to fill the overlapping portion. For this reason, the flange portion 53 and the inner tubular portions 51 can be firmly bonded. The recess portions 536 and 514 are provided in the overlapping portion, and thus large contact areas of the flange portion 53 and the inner tubular portion 51 with respect to the adhesive portion 8 can be ensured, as a result of which, the flange portion 53 and the inner tubular portion 51 can be firmly bonded. Furthermore, in the overlapping portion, the flange portion 53 and the inner tubular portion 51 include claw portions 531 and 511 that are positioned diagonally to each other, and the claw portions 531 and 511 are both embedded into the adhesive portion 8. For this reason, the flange portion 53 and the inner tubular portion 51 can be more firmly bonded by a so-called anchoring effect.

From the items (2) to (5) given above, the divided members of the resin cover 5 are firmly integrated together by the adhesive portions 7 and 8. Also, the magnetic core 3 and the resin cover 5 are firmly integrated together by the adhesive portions 7 and 8. Consequently, the reactor 1 has an excellent strength as a unitary body. For example, in the case where the reactor 1 is fixed and used by providing, on each outer cover portion 52 or the like, a fixing piece for fixing the reactor 1 to the installation object, even if a vibration, a thermal shock, or the like is applied, the resin cover 5 will not detach from the magnetic core 3, and thus the installation state can be maintained in a stable manner.

As described above, by providing the recess portions 524 and 534, the cutout portions 525 and 535, and the like, it is possible to prevent the adhesive in a flowable state from leaking out from the interface between the outer cover portion 52 and the flange portion 53. For this reason, it is unnecessary to perform the step of wiping off the leaked adhesive, or the like. From this point of view, the reactor 1 has further excellent manufacturability and also an excellent outer appearance.

The disclosure of the present application is not limited to the examples given here, and the scope of the disclosure of the present application is indicated by the appended claims, and all changes that come within the meaning and range of equivalency of the claims are intended to be embraced within the scope of the disclosure of the present application.

For example, at least one of the following changes may be made to the reactor according to Embodiment 1 described above.

Variation 1

The protruding portion may be provided only in the flange portion 53, or in each of the flange portion 53 and the outer cover portion 52.

In the case where the protruding portion is provided only in the flange portion 53, the flange portion 53 may include the protruding portion that protrudes from the outer end face 530 toward the outer cover portion 52, and the abutting portion 520 of the outer cover portion 52 may be configured as a flat surface. In the case where the protruding portion is provided in each of the flange portion 53 and the outer cover portion 52, the position at which the protruding portion of the flange portion 53 is formed and the position at which the protruding portion of the outer cover portion 52 is formed may be displaced in at least one of an arrangement direction in which the winding portions 2*a* and 2*b* are provided side by side (a direction perpendicular to the plane of FIG. 3) and a direction perpendicular to the arrangement direction (in the up down direction in FIG. 3). Alternatively, the protruding portion of the flange portion 53 and the protruding portion of the outer cover portion 52 may be provided to abut against each other. In this case, the protrusion heights of the protruding portions are adjusted such that a predetermined gap g can be formed as a result of the protruding portions being provided to abut against each other.

Variation 2

The inner tubular portion 51 is integrated with one of the flange portions 53. Alternatively, the inner tubular portion 51 may be divided into two parts (not necessarily divided into two equal parts), and the divided tubular portions may be integrated with the flange portions 53 and 53, respectively.

As a result of the inner tubular portion 51 or the divided tubular portions being integrated with the flange portion 53, the number of components to be assembled can be reduced, and further excellent manufacturability can be obtained. In the case where divided tubular portions are used, by configuring the divided tubular portions so as to be capable of connecting to each other, the divided tubular portions can be integrated together. For example, the end portions of the divided tubular portions may be overlapped by adjusting the dimensions of the end portions of the divided tubular portions and inserting the end portion of one of the divided tubular portions into the end portion of the other divided tubular portion.

Variation 3

The inner core portion and the outer core portion may be separately independent core pieces. The core pieces may be integrated together using an adhesive. A gap material may be interposed between the core pieces. The constituent material of the core piece that forms the inner core portion and the constituent material of the core piece that forms the outer core portion may be the same or different.

Variation 4

The outer circumferential shape of the inner core portion is not similar to the inner circumferential shape of the winding portions. For example, in the case where the inner circumferential shape of the winding portions is a rectangular tubular shape as described in Embodiment 1, the outer circumferential shape of the inner core portion may be cylindrical or the like.

Variation 5

The reactor includes at least one of the following components:

(5-1) a sensor (not shown) that measures a physical quantity of the reactor such as a temperature sensor, an electric current sensor, a voltage sensor, or a magnetic flux sensor;

(5-2) a heat dissipation plate (for example, a metal plate or the like) that is attached to at least a portion of the outer circumferential surface of the winding portions 2*a* and 2*b* of the coil 2; and (5-3) a bonding layer (for example, an adhesive, in particular, it is preferable to use an adhesive with excellent insulation properties) that is interposed between the installation surface of the reactor and installation object or the heat dissipation plate.

The invention claimed is:

1. A reactor comprising:

a coil that includes a winding portion;

a magnetic core that includes an inner core portion that is disposed within the winding portion and an outer core portion that is disposed outside the winding portion;

a resin cover that houses at least a portion of the magnetic core; and an adhesive portion that is provided so as to fill a gap between an outer circumferential surface of a housing portion of the magnetic core and an inner circumferential surface of the resin cover, and bonds the housing portion and the resin cover, wherein the resin cover includes:

a flange portion that includes a surface that comes into contact with an end face of the winding portion and a through hole through which the inner core portion is inserted;

an outer cover portion that includes a housing portion that houses the outer core portion and an abutting portion that comes into contact with a portion of the flange portion, the portion being on a side opposite to the surface that comes into contact with the winding portion; and a protruding portion that forms the gap between an outer circumferential surface of the outer core portion and an inner circumferential surface of the outer cover portion in a state in which the flange portion and the outer cover portion abut against each other.

2. The reactor according to claim 1, wherein the flange portion includes a tubular portion that is disposed so as to overlap an opening-side region of the outer cover portion, and the tubular portion of the flange portion and the opening-side region of the outer cover portion include recess portions that form a space that is filled with a portion of an adhesive that constitutes the adhesive portion.

3. The reactor according to claim 2, wherein the tubular portion of the flange portion and the opening-side region of the outer cover portion include claw portions that are provided to face each other and to be displaced in an axis direction of the through hole, and the two claw portions are embedded into the adhesive that is provided so as to fill the recess portions.

4. The reactor according to claim 1, wherein the resin cover includes an inner tubular portion that houses the inner core portion.

5. The reactor according to claim 2, wherein the resin cover includes an inner tubular portion that houses the inner core portion.

6. The reactor according to claim 3, wherein the resin cover includes an inner tubular portion that houses the inner core portion.

* * * * *